United States Patent [19]

Desblache et al.

[11] 3,947,768
[45] Mar. 30, 1976

[54] CARRIER-MODULATION DATA TRANSMISSION EQUALIZERS

[75] Inventors: Andre E. Desblache, Nice, France; Thomas E. Stern, Riverdale, N.Y.

[73] Assignee: International Business Machines Corporation, Armonk, N.Y.

[22] Filed: Jan. 8, 1975

[21] Appl. No.: 539,493

[52] U.S. Cl. .................... 325/42; 325/65; 333/18; 333/28 R; 333/70 T
[51] Int. Cl.² ............................................ H04B 3/04
[58] Field of Search ............... 333/18, 28 R, 70 T; 328/167; 325/42, 474, 476, 65

[56] References Cited
UNITED STATES PATENTS

| | | | |
|---|---|---|---|
| 3,614,623 | 10/1971 | McAuliffe | 325/42 |
| 3,755,738 | 8/1973 | Gitlin et al. | 333/18 X |
| 3,868,603 | 2/1975 | Guidoux | 333/18 |
| 3,878,468 | 4/1975 | Falconer et al. | 333/18 X |

*Primary Examiner*—Paul L. Gensler
*Attorney, Agent, or Firm*—Delbert C. Thomas

[57] ABSTRACT

The feature of the invention is an adaptive equalizer for modulated carrier transmission systems in which a received signal is subjected to a Hilbert transformation to obtain a second signal having a 90° phase shift for all components. The two signals are then passed through a pair of filters each and the outputs are cross-combined to generate the cartesian coordinate signals of an equalized signal. The coordinate signals are combined in a polar converter and are then decoded to detect the amplitude and phase data components of the received signal.

The equalizers are made adaptive by determining at each sampling time, the phase and amplitude errors in the signal and using these errors to modify the coefficients of the equalizing filters. The phase and amplitude errors are recoded into Cartesian coordinates and multiplied by the values of the samples at each tap of the filters to generate four error signals for each tap. A cross combination of these signals is time averaged and used to adjust the corresponding coefficients at the associated taps of the equalizer.

11 Claims, 6 Drawing Figures

CARRIER-MODULATION DATA TRANSMISSION EQUALIZERS

FIELD OF THE INVENTION

This invention relates to data transmission systems wherein modulation of a carrier is involved and, more particularly, to the equalization techniques intended to compensate for the linear distortions introduced into the transmitted signals by the transmission medium.

When data signals are transmitted through a transmission medium, such as a telephone line, each application of a signal to the medium generates time-components which, when they are not removed or compensated for, may interfere with the transmission of one or more successive data signals if the space between signals is lower than a critical value, and can cause an erroneous detection of the data signals at the reception site. Such an interference, the so-called intersymbol interference, is due to the characteristics of the transmission medium itself and is increased by the noise which is introduced into said medium by external sources which are very often difficult to control.

As the tendency in the art is to increase the rate of transmitted data, the problem raised by the linear distortions introduced by the transmission media appears to be of capital importance. In order to solve such a problem, it has long been proposed to provide, before data detection, at the receiver, for a correction device to correct the received data signal, the purpose of the device being to compensate for the linear distortions introduced by the transmission medium. Such devices are known under the term of equalizers.

Initially, these equalizers were conceived as networks in which the amplitude-versus-frequency, and phase-versus-frequency characteristics compensated approximately for the corresponding characteristics of the transmission medium so that the combination of the medium with such networks might present a relatively constant amplitude-versus-frequency characteristic and a comparatively linear phase-versus-frequency characteristic. Such systems have been utilized, and are still being utilized, for relatively low rate data transmissions, up to 2400 bits per second. They have proved inefficient at higher rates.

A sharp improvement has been obtained by making use of linear equalizers bringing recursive or transversal filter techniques into play. A first type of linear equalizer has been conceived for a baseband operation, i.e., after the signal transmitted by carrier modulation has been demodulated. For the application of such a technique to linear modulation transmissions (amplitude modulation, vestigal sideband modulation) reference is made to the articles by R. W. Lucky in "The Bell System Technical Journal" of Apr. 1965 (pages 547 through 588) and Feb., 1966 (pages 255 through 286) and entitled "Automatic Equalization for Digital Communication" and "Techniques for Adaptive Equalization of Digital Communication System," respectively.

For an application to non-linear modulation (phase modulation), reference is made to CCITT contribution No. 171, Dec., 1971 for study group Sp.A. In that case, demodulation is carried out by means of two carriers in quadrature and equalization is carried out on each carrier channel, allowing for the interaction between channels.

In these techniques, the major drawback is that demodulation must be carried out on the reception side of the transmission medium and, therefore, the carrier signal must be precisely recovered. However, such demodulation prevents digital techniques from being used in the implementation of the reception unit.

For this reason, several proposals have been made to enable the equalizer to operate directly in the frequency band of the channel wherein the transmission is carried out. In regard to such proposals, reference is made to the articles by R. W. Lucky and H. R. Rudin, "An Automatic Equalizer for General Purpose Communication Channels," and H. R. Rudin, Jr., "A Continuously Adaptive Equalizer for General Purpose Communication Channels," published in "The Bell System Technical Journal" in issues of Nov., 1967 (pages 2179–2208) and July-Aug., 1969 (pages 1865–1884), respectively. The disclosed technique consists in continuously superimposing a test signal onto the data signal, generating a duplicate of such test signal at the reception side and comparing the duplicate with the received test signal to define an error which can be utilized for the adjustment of the equalizer. Such a technique, in addition to the fact that it is relatively cumbersome due to the duplication of the circuits it implies, has a drawback in that it increases the noise level; indeed, the test signal appears in the form of noise for data signal detection, and conversely.

French Pat. No. 72 01484 filed on Jan. 10, 1972 by the assignee of this application, under the title, "Perfectionnement aux systemes de'egalisation" proposes to have the equalizer operate in the transmission channel but to bring the equalized signal into another frequency range wherein an error can be conveniently defined. Such a technique implies also a demodulation or modulation, an operation which, though less cumbersome than when carried out before equalization, is nevertheless a drawback when digital techniques are contemplated.

For the particular case of phase-modulation, French Pat. No. 72 15578 filed on Apr. 26, 1972 by the assignee of this application under the title, "Perfectionnements aux egaliseurs pour transmission en modulation de phase" discloses a transversal equalizer operating in the transmission channel.

All these equalization techniques in the transmission channel, however, have the same defect; the taps in the delay line of the transversal equalizer must be time-spaced at a distance less than the time interval separating two consecutive data elements, in order to meet the Nyquist's criterion. This fact has several consequences: first, the number of taps necessary for a given length of the delay line (and therefore, practically, for a given equalization quality) is increased. Secondly, the correlation between the signals at the various taps introduces instability into the equalizer loop when said equalizer operates in the adaptive mode. This instability results in a comparatively long time of convergence (about several seconds) and some drift of the values of the equalizer coefficients after the optimum equalization has been reached.

French Pat. No. 72 20097 published under Fr. Pat. No. 2 094 041 discloses still another technique for the case of phase-modulation: two transversal filters are utilized which share the same delay line but with two different groups of attenuators. The delay line receives the signal at the output of the transmission line after it has been submitted to a translation in a higher frequency range. The first group of attenuators operates directly upon the signals gathered at the taps of the delay line whereas the second group of attenuators operates upon these signals after they have been submitted to a 90° phase-rotation over all their frequency range (Hilbert transformation). The output signal of the equalizer results from the summation of the outputs of the two groups of attenuators. This equalized signal is compared with a reference amplitude threshold at determined instants in order to supply an error signal. The attenuators are adjusted in relation to a correlation between the error signal and the signals directly gathered at the taps, for the first group of attenuators, and to a correlation between the error signal and the signals which have been 90° rotated, for the second group of attenuators.

Such a technique, with which it is possible to make use of a delay line having taps which are separated by the time interval between two adjacent data elements on the line, has, however, a few drawbacks. The use of a Hilbert transformer on each tap on the delay line is, in actual fact, impracticable when digital techniques are involved: the complexity which would result therefrom would preclude an economic commercial implementation of the device. Furthermore, the frequency transposition carried out upstream the equalizer, and imposed both by the necessity of achieving simple analog Hilbert transformers and by the method of generation of the error signal, also makes an entirely digital implementation impossible. Indeed, the sampling of the transposed analog signal would have to be made at a very high frequency and the number of the samples to be moved through the delay line would be so large as to prohibit the use of a practical delay line.

A technique which is apparently similar to that of the present disclosure is published in an article, "Passband-Equalization of Differentially Phase-Modulated Data Signals" by R. D. Gitlin, E. Y. Ho, and J. E. Mazo. The article is in the Bell System Technical Journal of Feb., 1973, starting at page 219 and describes a similar mathematical analysis, but the equalizer and tap structure are, so far as can be determined, substantially different from the present disclosure.

OBJECTS OF THE INVENTION

Therefore, the main object of this invention is to provide for an automatic carrier-modulation data transmission equalizer which can be easily implemented with digital techniques, and without implying any frequency modulation or transposition.

Another object of this invention is to provide an automatic equalizer for carrier modulation transmissions, operating within the transmission frequency domain by using a delay line provided with taps separated by a time equal to the interval between information elements on the transmission line.

A further object of this invention is to provide for a carrier-modulation data transmission equalizer which rapidly converges to an optimum equalization, and which is stable.

Generally, this invention proposes a carrier-modulation data transmission equalizer wherein a signal $\hat{r}(t)$ is generated from signal $r(t)$ received from the transmission line by submitting $r(t)$ to a Hilbert transformation, and then, the signals $r(t)$ and $\hat{r}(t)$ are applied to two filters having for impulse responses, $h_1(t)$ and $h_2(t)$, respectively, so as to generate the two components $y(t)$ and $\hat{y}(t)$ of the equalized signal:

$$\begin{cases} y(t) = h_1(t) \otimes r(t) - h_2(t) \otimes \hat{r}(t) \\ \hat{y}(t) = h_1(t) \otimes \hat{r}(t) + h_2(t) \otimes r(t) \end{cases}$$

where sign $\otimes$ is representative of a convolution.

The equalization is made adaptive by generating two error signals $\delta y$ and $\delta \hat{y}$ from these components $y(t)$ and $\hat{y}(t)$, which signals are respectively utilized to adjust the impulse responses $h_1(t)$ and $h_2(t)$ so as to reduce the error at the equalizer output to a minimum.

According to a more specific embodiment, the equalization is made adaptive by sampling signals $y(t)$ and $\hat{y}(t)$ at characteristic instants and by generating from the so-obtained samples $y_k$, $\hat{y}_k$, the polar coordinates:

$$\begin{cases} \rho_k = (y_k^2 + \hat{y}_k^2)^{1/2} \\ \phi_k = \arctan \dfrac{\hat{y}_k}{y_k} \end{cases}$$

wherefrom the discrete values $\hat{\rho}_k$ and $\hat{\phi}_k$ carrying the data are decoded as well as the error signals $$\begin{cases} \delta\rho_k = \rho_k - \hat{\rho}_k \\ \delta\phi_k = \phi_k - \hat{\phi}_k \end{cases}$$

These error signals are utilized to generate the cartesian components of the error signal $\delta y_k$ and $\delta \hat{y}_k$, which are, thereafter, utilized to adjust the pulse responses $h_1(t)$ and $h_2(t)$ in order to reduce the error at the equalizer output.

BRIEF DESCRIPTION OF THE DRAWINGS

This invention will be further described, by way of a non-limiting example, with reference to the accompanying drawings.

DETAILED DESCRIPTION

For a better understanding of this invention, it is necessary first to point out the problems which are solved by this invention. This is done with reference to FIGS. 1, 2, and 3. To make the understanding clearer, it will be assumed that the modulation is of the multilevel phase-modulation type.

Figure 1:
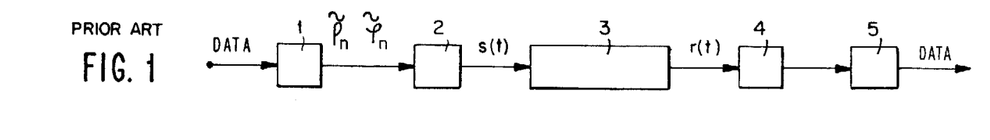
FIG. 1 is a schematic diagram of a carrier-modulation data transmission system.

FIG. 1 is a schematic diagram of a conventional digital data transmission system. In multilevel phase-modulation transmission systems, data are coded, in coder 1, in the form of sequences of discrete amplitude and phase level signals ($\tilde{p}_n$, $\tilde{\phi}_n$). In the following description, the superscript sign ~ will means a discrete value. These sequences of discrete values are utilized to modulate a sequence of pulses of envelope $S(t)$ and carrier $f_o$ in a modulator 2, in order to supply a signal $s(t)$ to be transmitted in the form:

$$s(t) = \sum_{n=-\infty}^{+\infty} \tilde{p}_n S(t-nT) \cdot \cos(2\pi f_o t + \tilde{\phi}_n) \quad (1)$$

where T is representative of the time interval between two successive actions upon the carrier, i.e., the interval between two data elements signalled on the line. T is the reciprocal of the transmission rate of the data elements in the line, which is conventionally expressed in bauds. To make the understanding clearer, it will be recalled that the transmission rate is defined as being the number of actions per second, operated upon the carrier. For instance, in a phase-modulated transmission system, the transmission rate is 1200 bauds when 1200 phase-shifts are carried out per second upon the carrier.

In order to avoid systematic interference between the data elements on the line, it is well-known that the following equation must be satisfied:

$$\sum_{k=-\infty}^{+\infty} S\left(f + \frac{k}{T}\right) = \text{constant} \quad (2)$$

where $$S(f) = \int_{-\infty}^{+\infty} S(t) e^{-j2\pi ft} dt$$

is the spectrum of envelope $S(t)$, i.e., the Fourier transform of $S(t)$ and $j = \sqrt{-1}$.

In addition, in the following description, it will be supposed that signal $S(t)$ occupies a limited frequency band, i.e., $$S(f) = 0 \text{ when } |f| \geq f_a \quad (3)$$

The signal obtained at the output of transmission line 3 is represented by $r(t)$. The instantaneous amplitude and phase of signal $r(t)$ at instants $kT$, where $k$ successively assumes all integer values are recovered in a receiver 4 and decoded in a decoder 5 which functions inversely to coder 1 and provides the received data.

Figure 2:
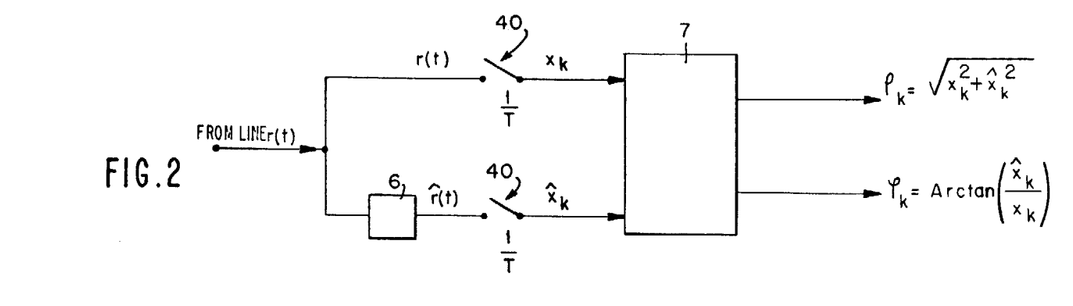
FIG. 2 is a schematic diagram of a receiver for receiving data transmitted according to the scheme of FIG. 1, when there are no line distortions.

FIG. 2 is a schematic showing of such a receiver using digital circuits. Signal $r(t)$, received from the transmission line, is applied (lower branch of the diagram) to a circuit 6 which is a phase-shift network completing a 90° phase-shift upon all the frequencies in the frequency band occupied by $r(t)$. Circuit 6 achieves the Hilbert transformation and will be called a Hilbert filter. As is well-known, the transfer function $H(t)$ of said filter is such that it completes a phase shift equal to $-\pi/2$, sign $f$.

Therefore, signal $\hat{r}(t)$ which is the Hilbert transform of signal $r(t)$ is obtained at the output of circuit 6. It should be noted at this point that, instead of having a 90° phase shifter on the lower branch of the diagram, it would amount to the same effect if we were to place a +45° phase shifter in the upper branch and a −45° phase shifter in the lower branch. This remark will apply to the rest of this description and will not be repeated for each use of the Hilbert filter.

According to the assumption made in the above equation 3, signal $\hat{r}(t)$ can be written:

$$\hat{r}(t) = \sum_{n=-\infty}^{+\infty} \tilde{p}_n S(t-nT) \sin(2\pi f_o t + \tilde{\phi}_n).$$

Signals $r(t)$ and $\hat{r}(t)$, which will be called in-phase signal and in-quadrature signal, respectively, are sampled every T seconds, as indicated by the diagrammatic switches 40 in FIG. 2, in order to supply samples $x_k$ and $\hat{x}_k$, respectively.

According to the assumption made in the above equation (2), the signals at the output of the sampling devices 40 can be written:

$$\begin{cases} x_k = r(kT) = \tilde{p}_k \cos(2\pi f_o kT + \tilde{\phi}_k) \\ \\ \hat{x}_k = \hat{r}(kT) = \tilde{p}_k \sin(2\pi f_o kT + \tilde{\phi}_k) \end{cases}$$

These signals $x_k$ and $\hat{x}_k$ are applied to a coordinate converter 7 which transforms the cartesian coordinates into polar coordinates, thereby supplying:

$$\begin{cases} \rho_k = (x_k^2 + \hat{x}_k^2)^{1/2} \\ \\ \phi_k = \text{Arctan} \dfrac{\hat{x}_k}{x_k} \end{cases}$$

that is to say $$\begin{cases} \rho_k = \tilde{p}_k \\ \\ \phi_k = \tilde{\phi}_k + 2\pi f_o kT \end{cases} \quad (4)$$

The so-obtained values $\rho_k$ and $\phi_k$ are then decoded in a decoder 5 (as in FIG. 1) in order to return the transmitted data, after term $2\pi f_o kT$ is eliminated. Such an elimination presents no difficulty since the eliminated term depends only on $k$, which is the rank number of the corresponding sample in the sample sequence as well as the rank number of the data element transmitted over the line. This elimination can be made either at level decoder 5 or at level coder 1 as soon as data are transmitted.

Heretofore, the system has been studied in the case of an ideal transmission line with which it was possible to write $r(t)=s(t)$. Of course, in practice, this is never obtained. Therefore, there will now be considered the distortion characteristics most currently encountered on the transmission lines and, more particularly, on telephone lines. In order to make the analysis easier, it is desirable to work upon a complex analytic expression of the signals. In the following description, the sign // is indicative of a complex quantity.

The (complex) signal received from the transmission line, therefore, can be written:

$$/r(t)/ = r + j\hat{r} = \sum_{n=-\infty}^{+\infty} /\alpha_n/ \cdot /\psi(t-nT)/ + /b(t)/ \quad (5)$$

where: $/b(t)/$ is representative of a term due to noise, $$|\alpha_n| = \alpha_n + j\hat{\alpha}_n \quad \text{with } \alpha_n = \bar{\rho}_n \cos(2\pi f_o t + \bar{\phi}_n)$$

$$\text{and } \hat{\alpha}_n = \bar{\rho}_n \sin(2\pi f_o t + \bar{\phi}_n)$$

$$|\psi(t)| = S'(t)e^{j[2\pi f_o t + \theta(t)]}$$

with $S'(t) \neq S(t)$ and $\theta(t) \neq 0$

These last two conditions describe the linear amplitude and phase-distortion characteristics of the transmission line.

It is to be noted here that other causes of distortion exist but these are not taken into account in order to make the explanation clearer.

Returning to the schematic diagram shown in FIG. 2, the signals resulting from the sampling operation of $r(t)$ and $\hat{r}(t)$ can be written, in a complex form, $$|x_k| = x_k + j\hat{x}_k = |r(kT)|$$

[It should be noted, here, and by way of a verification, that, when there is neither noise nor distortion, i.e., $S'(t) = S(t)$, $\theta(t) = 0$ and $|b(t)|=0$, the ideal condition is found back:

$$|x_k| = |\alpha_k|$$

that is to say:

$$x_k+j\hat{x}_k=\alpha_k+j\hat{\alpha}_k=\bar{\rho}_k\cos(2\pi f_o kT+\bar{\phi}_k)+j\bar{\rho}_k\sin(2\pi f_o kT+\bar{\phi}_k) \quad (6)$$

Equation (6) is then simply another way of writing the above equation (4).]

Figure 3:
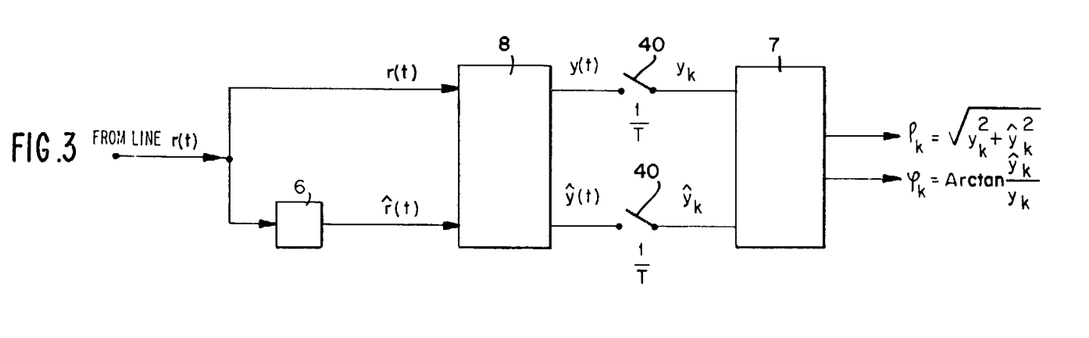
FIG. 3 is a schematic diagram of a receiver for receiving data transmitted according to FIG. 1, provided with an equalizer for compensating for the linear distortions introduced by the transmission channel.

In order to reduce the linear distortion effect and to best approach the ideal condition $|x_k|=|\alpha_k|$; an equalizer, as shown by reference 8 in FIG. 3, must be inserted. The function of this equalizer will be to generate from input signal $r(t)$, a complex signal:

$$|y_k| = y_k + j\hat{y}_k$$

so that $|y_k|$ be as close to $|\alpha_k|$ as possible, i.e., $y_k-\alpha_k$ and $\hat{y}_k - \hat{\alpha}_k$ be as small as possible. As shown in FIG. 2, the phase and amplitude information in such a signal will be recovered by coordinate conversion in converter 7 so as to obtain $$\rho_k = (y_k^2 + \hat{y}_k^2)^{1/2}$$

and $$\phi_k = \text{Arctan} \frac{\hat{y}_k}{y_k}$$

To this end, the invention proposes to make use of the complex equivalent of an equalization filter. Such a complex filter includes $(2N+1)$ complex coefficients which will be referred to as $|c_i|=c_i+jd_i$.

The impulse response of a real transversal filter which would have $c_i$ for coefficients, will be designated by $h_1(t)$, and the impulse response of a real filter which would have $d_i$ for coefficients, will be designated by $h_2(t)$. Signals $r(t)$ and $\hat{r}(t)$ are applied to complex equalizer 8 which will supply a complex equalized signal:

$$|y(t)| = y(t) + j\hat{y}(t)$$

where $$y(t) = h_1(t) \otimes r(t) - h_2(t) \otimes \hat{r}(t)$$

$$\hat{y}(t) = h_1(t) \otimes \hat{r}(t) + h_2(t) \otimes r(t) \quad (7)$$

where sign $\otimes$ denotes a convolution.

The sample sequences $y_k$ and $\hat{y}_k$ will then be obtained by sampling signals $y(t)$ and $\hat{y}(t)$, as indicated by the switches 40 in FIG. 3.

In the preferred embodiments of this invention which will be described in detail with reference to FIGS. 4, 5 and 6, the real filters are transversal filters each having a delay line with $(2N+1)$ taps, the taps being spaced T apart.

In that case, equations (7) can be written, when introducing coefficients $c_l$ and $d_l$:

$$y(t) = \sum_{l=0}^{2N} [c_l \cdot r(t-lT) - d_l \cdot \hat{r}(t-lT)]$$

$$\hat{y}(t) = \sum_{l=0}^{2N} [c_l \cdot \hat{r}(t-lT) + d_l \cdot r(t-lT)] \quad (8)$$

Figure 4:
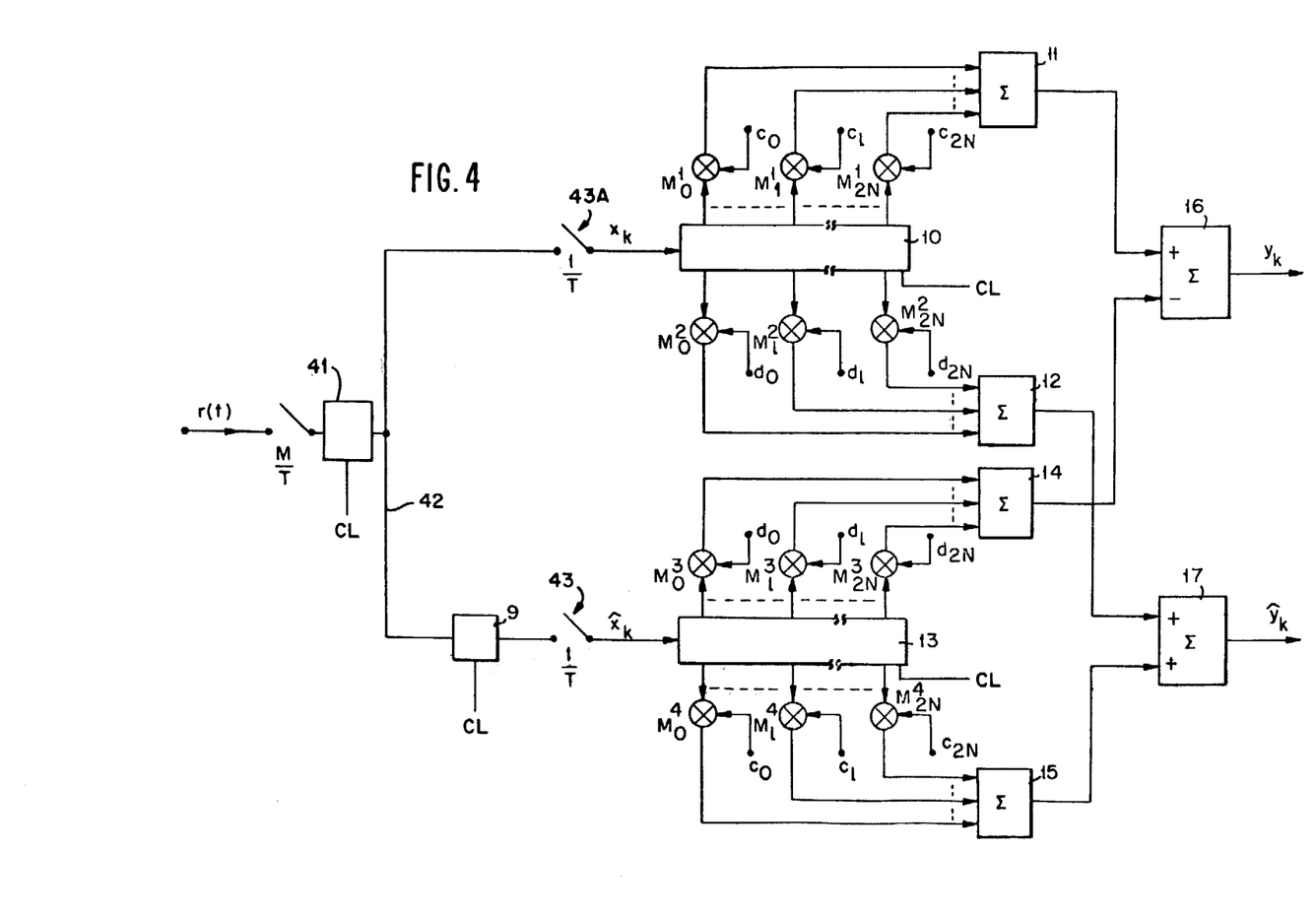
FIG. 4 is a schematic diagram of a first embodiment of the filtering portion of the equalizer.

FIG. 4 shows a preferred embodiment of the equalizer according to this invention. Analog signal $r(t)$ as received from the transmission line is sampled at a frequency M/T, where M is such that M/T is higher than the Nyquist frequency (i.e., twice the highest frequency of the spectrum of the transmitted signal). The samples are passed into an analog to digital converter 41 which will put a parallel group of signals on a bus 42 for each sample. The so-obtained samples are submitted to a second sampling operation at a switch 43A at a frequency 1/T in order to produce a sampling sequence $x_k$, and, in parallel, are applied to Hilbert filter 9. Such a filter may be digitally implemented by means of a conventional transversal filter. As noted above, Hilbert filter 9 proceeds to a 90° phase shift upon each of the frequencies in the spectrum of the input signal. The output signal of filter 9 is also sampled at frequency 1/T by switch 43 in order to produce a sample sequence $\hat{x}_k$. The higher frequency of sampling of the input to A to D converter 41 is to provide the Hilbert transformer 9 with a high speed sample occurrence which will enable a more efficient transform operation.

Samples $x_k$ are applied to a digital delay line 10, for instance, parallel shift registers, one for each bit in the $x_k$ sample, and each having $(2N+1)$ taps which are T time-spaced. Two sets of multipliers $M_0^1$ through $M_{2N}^1$ and $M_0^2$ through $M_{2N}^2$ are respectively connected to the $2(N+1)$ set of delay line taps. The multipliers multiply the bits of the signals at the corresponding taps by the bits of corresponding coefficients designated by $c_0$ through $c_{2N}$ and $d_0$ through $d_{2N}$, respectively. The outputs of multipliers $M_0^1$ through $M_{2N}^1$ are summed in an adder 11 whereas the outputs of multipliers $M_0^2$ through $M_{2N}^2$ are summed in adder 12.

In like manner, samples $\hat{x}_k$ from switch 43 are applied to a digital delay line 13 which, here also, is, for instance, a second paralleled shift register with $(2N+1)$ sets of taps which are T time-spaced.

Two other sets of multipliers $M_0^3$ through $M_{2+N}^3$ and $M_0^4$ through $M_{2N}^4$ are connected, one from each set to each corresponding tap. The bits of coefficients $d_0$ through $d_{2N}$ are also supplied to multipliers $M_0$ through $M_{2+N}{}^3$, respectively and the bits coefficients $c_0$ through $c_{2N}$ are supplied to multipliers $M_0{}^4$ through $M_{2N}{}^4$, respectively. The outputs of multipliers $M_0{}^3$ through $M_{2N}{}^3$ are summed up in adder 14 and the outputs of multipliers $M_0{}^4$ through $M_{2N}{}^4$ are summed in adder 15.

Finally, the outputs of adders 11 and 14 are combined in subtractor 16, with a plus sign being assigned to the output of adder 11 and a minus sign being assigned to the output of adder 14. The sample sequence $y_k$ is obtained at the output of adder 16, i.e., $$y_k = \sum_{l=0}^{2N} (c_l \cdot x_{k-l} - d_l \cdot \hat{x}_{k-l})$$

where $x_{k-l}$ and $\hat{x}_{k-l}$ are the signals appearing at the $l^{th}$ taps in the delay lines 10 and 13, respectively.

Also, the outputs of adders 12 and 15 are combined in adder 17 and are both provided with a plus sign in order to generate the sample sequences $\hat{y}_k$, i.e., $$\hat{y}_k = \sum_{l=0}^{2N} (c_l \cdot \hat{x}_{k-l} + d_l \cdot x_{k-l})$$

Samples $y_k$ and $\hat{y}_k$ are the two components of the complex equalized signal $/y_k/$ coming from equalizer 8, FIG. 3. As said with reference to FIG. 3, these samples are converted in decoder 7 in order to supply the polar coordinates $\rho_k$ and $\phi_k$ which are representative of the phase and amplitude information from which the data are extracted through a later decoding operation.

Figure 5:
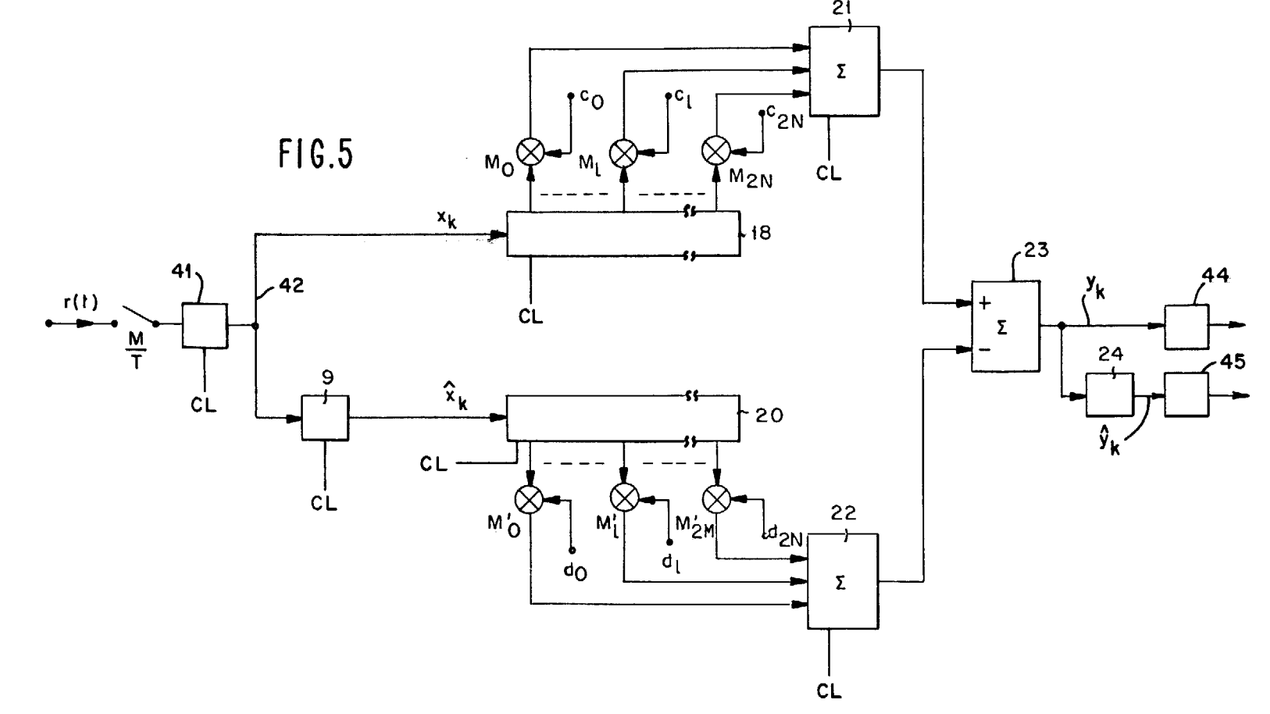
FIG. 5 is a schematic diagram of a second embodiment of the filtering portion of the equalizer.

FIG. 5 shows another embodiment of this invention which will be particularly useful when, for any reason, it is necessary to have a plurality of samples of the equalized signal at the output of the equalizer within a time period T. In the embodiment of FIG. 4, there is only one output sample on each output per period T.

In FIG. 5, the received signal r(t) is still sampled at frequency M/T, and the samples are converted in A to D converter 41 to a group of bit signals on data bus 42. The samples $x_k$ are applied over bus 42 to the digital delay line 18, for instance, a set of parallel shift registers, and the samples are applied to Hilbert filter 9 in order to generate samples $\hat{x}_k$, which are sent into digital delay line 20. It should be noted here, that there are M samples each of $x_k$ and $\hat{x}_k$ per period T.

Delay lines 18 and 20 have (2N+1) taps each and the taps are still T time-spaced and will have M−1 positions between each tap. Multipliers $M_0$ through $M_{2N}$ receive the bit signals outputted at the corresponding taps in line 18 and multiply each of them by the corresponding coefficients $c_0$ through $c_{2N}$, respectively. The outputs of multipliers $M_0$ through $M_{2N}$ are added in adder 21. Likewise, multipliers $M_0'$ through $M_{2N}'$ receive the bit signals at the outputs of the corresponding taps in line 20 and multiply each of them by the corresponding coefficients $d_0$ through $d_{2N}$, respectively. The outputs of multipliers $M_0'$ through $M_{2N}'$ are added in adder 22.

Finally, the outputs of the two adders 21 and 22 are combined in subtractor 23 with a plus sign being assigned to the output of adder 21 and a minus sign being assigned to the output of adder 22.

The output of adder 23 supplies the sample sequence $y_k$:

$$y_k = \sum_{l=0}^{2N} (c_l x_{k-l} - d_l \hat{x}_{k-l})$$

where $x_{k-l}$ and $\hat{x}_{k-l}$ are the signals gathered at the $l^{th}$ taps of delay lines 18 and 20, respectively.

The sequence of samples $\hat{y}_k$ is obtained by causing the filtered samples $y_k$ to pass into a second Hilbert filter 24, the output of which is:

$$\hat{y}_k = \sum_{l=0}^{2N} (c_l \hat{x}_{k-l} + d_l x_{k-l}).$$

Since there are M samples $y_k$ and $\hat{y}_k$ per time period T, the samples $(y_k, \hat{y}_k)$ which will be utilized for the extraction of the phase and amplitude information, will be chosen from among the M available couples by means of another sampling operation in switches 44 and 45, this time at a frequency 1/T.

With respect to the embodiment shown in FIG. 4, this second embodiment divides the number of the necessary multipliers by two but multiplies the number of the required positions in the delay lines as well as the computation rate of the multipliers and adders, by M. Above all, it makes it possible to have M sample couples $(y_k, \hat{y}_k)$ per time period T at the output of the equalizer, which may be desirable for reasons which are not pertinent to this invention, for instance, for the recovery of data synchronization.

After this description of the two embodiments of the equalizer of this invention, the following description sets out the way in which said equalizer can be made adaptive, i.e., the structure by which coefficients $/c_l/=c_l+jd_l$ are adjusted in order to make the operation of the equalizer constantly optimum.

In a conventional manner, the operation will be considered as optimum when the mean square error:

$$V = 1/2 \overline{|y_k/ - /\alpha_k|^2}$$

is a minimum (the horizontal bar indicates that a time-average is concerned, and the two vertical bars indicate that the modulus of the complex expression comprised therebetween, is to be considered).

By introducing error signals $\delta y_k$ and $\delta \hat{y}_k$ defined by $$\begin{cases} \delta y_k = y_k - \alpha_k \\ \delta \hat{y}_k = \hat{y}_k - \hat{\alpha}_k \end{cases}$$

it will be found $$V = \frac{1}{2} (\overline{\delta y_k^2} + \overline{\delta \hat{y}_k^2}).$$

The minimum of function V is obtained when the (4N+2) components of gradient V $$\frac{\partial V}{\partial c_l} = \overline{\delta y_k \cdot \frac{\partial (y_k)}{\partial c_l} + \delta \hat{y}_k \cdot \frac{\partial (\hat{y}_k)}{\partial c_l}}$$

$$\frac{\partial V}{\partial d_l} = \overline{\delta y_k \cdot \frac{\partial (\delta y_k)}{\partial d_l} + \delta \hat{y}_k \cdot \frac{\partial (\hat{y}_k)}{\partial d_l}}$$

are equal to zero.

But it should be noted that $$\frac{\partial (\delta y_k)}{\partial c_l}$$

is identical with $x_{k-l}$, i.e., the signal present at the $l^{th}$ tap in delay line 10 (FIG. 4) or 18 (FIG. 5) since the only term of $\delta y_k - y_k - \alpha_k$ that depends on $c_l$ is term $c_l \cdot x_{k-l}$ coming from the multiplication made at the $l^{th}$ tap. This result, which will not be developed in order to make the description clearer, obviously results from the generation of $y_k$ which can be followed on FIGS. 4 or 5. In like manner.

term $\dfrac{\partial (\delta y_k)}{\partial d_l}$ is identical with $-\hat{x}_{k-l}$ term $\dfrac{\partial (\delta \hat{y}_k)}{\partial c_l}$ is identical with $\hat{x}_{k-l}$ term $\dfrac{\partial (\delta \hat{y}_k)}{\partial d_l}$ is identical with $x_{k-l}$ By replacing these four terms by their so-specified values, it is found $$\dfrac{\partial V}{\partial c_l} = \overline{\delta y_k \cdot x_{k-l}} + \overline{\delta \hat{y}_k \cdot \hat{x}_{k-l}} \quad (8)$$

$$\dfrac{\partial V}{\partial d_l} = \overline{\delta \hat{y}_k \cdot x_{k-l}} - \overline{\delta y_k \cdot \hat{x}_{k-l}}$$

There can be deduced therefrom the recurrence relations for the adjustment of the coefficients $$c_l^{(m+1)} = c_l^{(m)} - \mu \dfrac{\partial V^{(m)}}{\partial c_l}$$

$$d_l^{(m+1)} = d_l^{(m)} - \mu \dfrac{\partial V^{(m)}}{\partial d_l} \quad (9)$$

where exponents ($m$) and ($m+1$) are representative of the successive iteration steps and $\mu$, is a scaling parameter.

Figure 6:
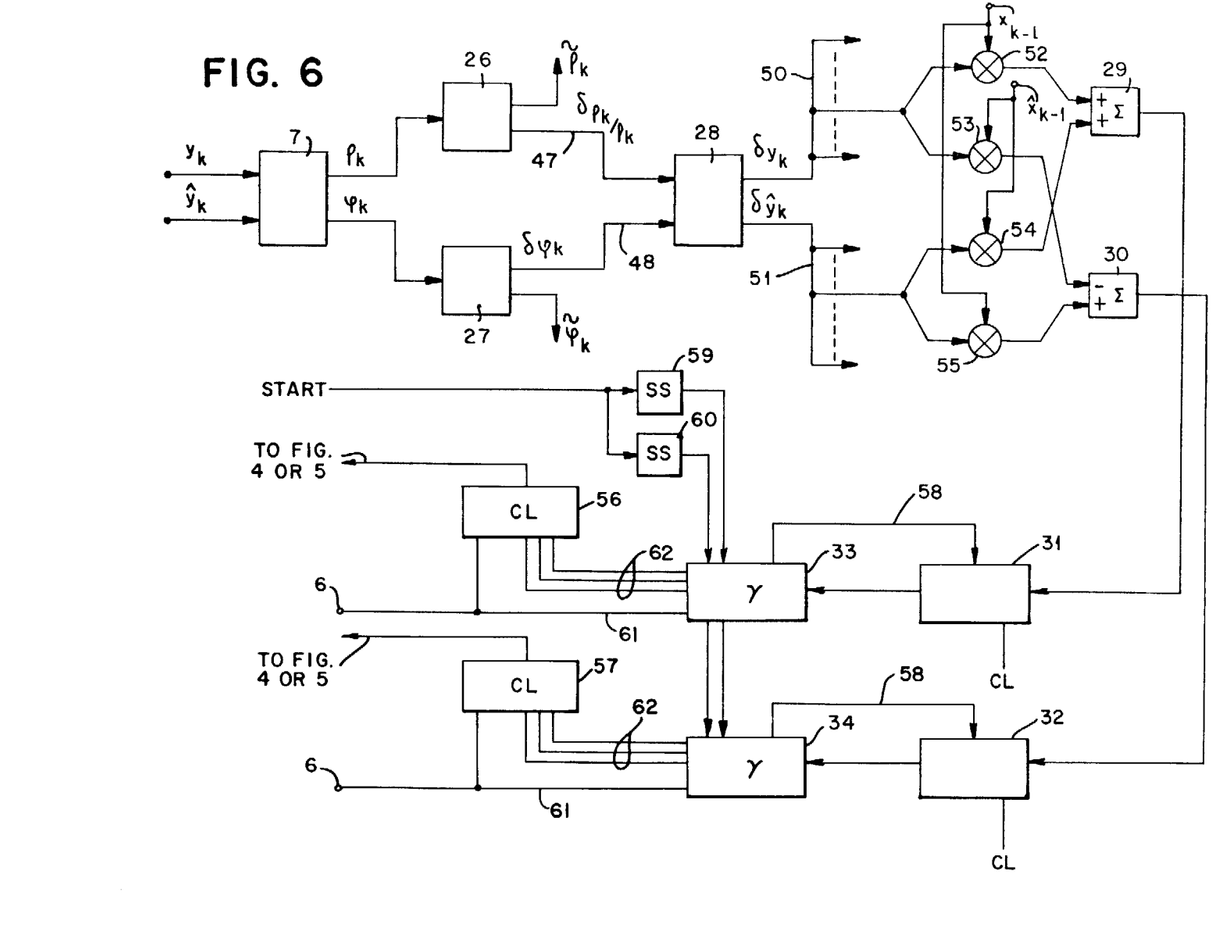
FIG. 6 is a schematic diagram of some of the circuits for adjusting the characteristics of the filtering portion of the equalizer.

FIG. 6 shows a preferred embodiment of the adjusting circuits for adjusting all of the coefficients $c_l$ and $d_l$ according to the analysis which has just been made.

Samples $y_k$ and $\hat{y}_k$ from FIGS. 4 or 5 are applied to coordinate conversion circuits 7, see FIG. 2, to supply signals $\rho_k$ and $\phi_k$; i.e., the phase and amplitude information carried by the received signal at the considered characteristic instant. Information signal $\rho_k$ is compared, in a comparator 26, with each of the different discrete amplitude levels $\tilde{\rho}_n$ utilized during transmission. These reference amplitude levels can, in a conventional manner, either be specified in advance or obtained during a test period prior to actual data transmission, or extracted from evaluations of the received data. Comparator 26 supplies to other signal circuits, the selected amplitude level $\tilde{\rho}_k$ which, from among levels $\tilde{\rho}_k$, is the closest to the received amplitude information $\rho_k$; it also supplies on a bus 47 relative amplitude error information $\delta \rho_k / \rho_k$ where $\delta \rho_k = \rho_k - \tilde{\rho}_k$.

Likewise, information $\phi_k$ is compared, in comparator 27, with the different discrete phase values $\tilde{\phi}_n$ utilized during transmission. Here again, these discrete reference values can be either specified in advance or extracted from evaluation of the received data. Comparator 27 supplies the phase value $\tilde{\phi}_k$ which, from among the $\tilde{\phi}_n$ values, is the closest to the received phase information $\phi_k$; it supplies also phase error information $\delta \phi_k = \phi_k - \tilde{\phi}_k$ on a bus 48.

Values $\tilde{\rho}_k$ and $\tilde{\phi}_k$ supplied by comparators 26 and 27 are then decoded in order to supply the data; the corresponding circuits have not been shown as they are conventional and not a part of this invention. As to error, the information $\delta \rho_k / \rho_k$ and $\delta \phi_k$, the signals on busses 47 and 48, are applied to coordinate conversion circuits 28 in order to supply the error information in cartesian coordinates on busses 50 and 51:

$$\begin{cases} \delta y_k = y_k \cdot \dfrac{\delta \rho_k}{\rho_k} - \hat{y}_k \cdot \delta \phi_k \\ \delta \hat{y}_k = \hat{y}_k \cdot \dfrac{\delta \rho_k}{\rho_k} + y_k \cdot \delta \phi_k \end{cases}$$

These error signals are then used to control modifications of the already used coefficients. The remaining circuits of FIG. 6 are for one pair of coefficients and are to be duplicated for each pair of coefficients. The error signals on busses 50 and 51 are each multiplied by the values of both of the non-equalized signals $x_k$, $\hat{x}_k$, which are then present at the taps of delay lines 10 and 13 (FIG. 4) or 18 and 20 (FIG. 5) which correspond to the pair of coefficients being adjusted. FIG. 6 shows the coefficient control circuits for the $l^{th}$ taps and it is obvious that (2N+1) similar circuits are required. The operation of the taps of rank l will be described, it being clear that it will be enough to vary l from 0 to 2N to obtain the coefficient adjustments at each tap.

According to the above equations 8, signals $\delta y_k$ on bus 50 are multiplied in a multiplier 52 by signals $x_{k-l}$ and $\hat{x}_{k-l}$ which are respectively gathered at the $l^{th}$ taps in the delay lines 10 and 13 (FIG. 4) or 18 and 20 (FIG. 5) respectively. Likewise, signals $\delta \hat{y}_k$ are multiplied in multipliers 54 and 55 by the same signals $x_{k-l}$ and $\hat{x}_{k-l}$.

Adders 29 and 30 respectively receive the outputs of multipliers 52, 53, 54, and 55 and form the sums:

and $\begin{cases} \delta y_k \cdot x_{k-l} + \delta \hat{y}_k \cdot \hat{x}_{k-l} & \text{for adder 29} \\ \delta \hat{y}_k \cdot x_{k-l} - \delta y_k \cdot \hat{x}_{k-l} & \text{for adder 30} \end{cases}$ i.e., the two components of function "gradient V" for the taps of rank l in delay lines 10 and 13 (or 18 and 20). These components are used to adjust the corresponding coefficients for the delay lines.

The values obtained at the outputs of adders 29 and 30 are individually accumulated in bidirectional counters 31 and 32, respectively. When the contents of a counter reaches a given positive $+\gamma$, or negative $-\gamma$, value, a corresponding threshold detector 33 or 34 causes the addition of a correction factor to a coefficient counter 56 or 57 when the counter contents reaches $-\gamma$, or subtracts the factor when the counter contents reaches $+\gamma$, at the corresponding coefficient. Also, at this time, the threshold detector 33 or 34 causes the corresponding counter 31 or 32 to be reset to zero through its line 58.

As a matter of interest, counters 31 and 32 make it possible to generate the time-average computation of the output signals of adders 29 and 30, and the ratio $\beta / \gamma$ is the scaling factor designated by $\mu$ in the above formulas (9). Values $\beta$ and $\gamma$ which, of course, are both positive, must satisfy two contradictory requirements:

ratio $\beta/\gamma$ must be sufficiently small in order to ensure the smooth convergence of the algorithm defined by formulas (9) towards an optimum but, on the other hand, a rapid start of the equalizer toward convergence requires of this ratio to be as large as possible. A good compromise consists in choosing $\beta$ high at the start and then in decreasing its value as the optimum is approached. The selection of $\beta$ is determined by a pair of single shot circuits 59 and 60 which will be fired at the start of reception of a communication. Single shot 59 may remain fired for about 100 sampling periods and single shot 60 may remain fired for 200 periods. The outputs are applied to all of the detectors 33 and 34 where they control the selection of the one of the lines 62 which will receive a $\beta$ signal. The lines 62 connect to different orders of the coefficient counters 56 and 57 to provide different scaling factors $\beta$. Lines 61 between the detector 33 or 34 and coefficient counters 56 and 57, respectively, are the add-subtract control lines.

The foregoing specification was particularly relative to the description of the preferred embodiment of the invention. In order to make this description clearer, a number of aspects have been but briefly referred to which, as a matter of fact, are not within the scope of this invention. As said during the above description, the basic time of the system is the sample time period T defined as the reciprocal of the transmission rate of the data elements in the line. As a matter of fact, this rate is duly defined on the transmission side but its recovery, on the reception side at the opposite end of the transmission medium, raises a number of problems owing to distortions on the line. Many solutions are well-known to those skilled in the art, solutions which, in brief, consist in making use of a local clock at the receiver the basic frequency of which is the same as the one of the clock utilized at the transmitter to define the transmission rate, and in precisely and continuously adjusting the frequency and phase of this local clock with the help of the information carried by the received data signal. Thus, a basic time T' is defined which is as close to T as possible and which is utilized to synchronize the operation of the system. Therefore, in practice, value T indicated in the description, will, in fact, be replaced by the so-obtained value T', but this does not change either the principle or the implementation of this invention.

The details of the coordinate transforming circuits have not been specifically described for these circuits are well-known in the art. By way of an example, reference is made to the article by J. E. Volder published in the review "IRE Transactions on Electronic Computers," Sept., 1959, and entitled "The CORDIC Trigonometric Computing Technique," pages 330–334. Another technique for obtaining the phase is described in French Pat. No. 71 47850, filed on Dec. 21, 1971 under the title, "Detecteur de phase digital."

By way of an example, the above system has been implemented for eight-phase-modulation transmissions with a rate $1/T$ of 1600 bauds according to the schematic diagram shown on FIG. 4. The Hilbert filters were seven-tap transversal filters. The sampling of the received signal was made at a rate of 14 400 Hz (M=9) and the digital samples were coded with twelve bits. The delay lines of the equalizer filters included nine taps each (N=4). Values $\beta$ and $\gamma$ were fixed such as follows: $\gamma=0.05$, $\beta=0.01$ for the first one hundred periods T; 0.005 for the next following one hundred periods, and, thereafter, 0.0025. From an initial state where each of the coefficients $c_i$ and $d_i$ had for a value zero except for median coefficient $c_5$ adjusted to one, the equalization was carried out at an average rate of 200ms in a $c_1$ conditioned 3002 type line (according to the terminology of A.T.&T.).

It is to be understood that the preceding description has been given only as an example and that numerous alternatives may be considered without departing from the spirit and scope of this invention as set forth in the appended claims.

What is claimed is:

1. An equalization method for equalizing carrier modulated data signals transmitted through a transmission medium which introduces linear distortions into the transmitted signals, each equalization method including the steps of:

a. performing a phase transformation on the distorted received signal $r(t)$ to obtain a signal $\hat{r}(t)$ in which the frequency components are in phase quadrature with respect to those same components of the received signal $r(t)$;

b. performing a filtering operation on said signals $r(t)$ and $\hat{r}(t)$, to generate two signals $y(t)$ and $\hat{y}(t)$ representing the in phase and quadrature components of an equalized output signal, said signals being such that $y(t) = h_1(t) \otimes r(t) - h_2(t) \otimes \hat{r}(t)$ $\hat{y}(t) = h_1(t) \otimes \hat{r}(t) + h_2(t) \otimes r(t)$ wherein $\otimes$ indicates a convolution operation and $h_1(t)$ and $h_2(t)$ are the filtering operation impulse responses of two filters, and c. recovering information about the phase and amplitude modulation of said modulated data signals from said equalized signal components.

2. An equalization method as set out in claim 1 in which the step (b) of forming signals $y(t)$ and $\hat{y}(t)$ comprises the steps of:

b1. applying signal $r(t)$ to a first filter having an impulse response of $h_1(t)$ and to a second filter having an impulse response $h_2(t)$;

b2. applying signal $\hat{r}(t)$ to a third filter having an impulse response of $h_2(t)$ and to a fourth filter having an impulse response of $h_1(t)$;

b3. subtracting the output signal of said third filter from the output signal of said first filter to provide signal $y(t)$; and b4. additively combining the output signals of said second and fourth filters to provide signal $\hat{y}(t)$.

3. An equalizing method as set in claim 2, in which the step (c) comprises the steps of:

c1. converting the cartesian coordinate signals $y(t)$ and $\hat{y}(t)$ into equalized polar coordinate signals $\rho(t)$ and $\phi(t)$;

c2. comparing, at selected intervals, the values of signals $\rho(t)$ and $\phi(t)$ with reference values to generate amplitude and phase error signals $\delta\rho$ and $\delta\phi$;

c3. converting said error signals $\delta\rho$ and $\delta\phi$ into cartesian coordinate signals $\delta y$ and $\delta\hat{y}$; and c4. adjusting said filter responses $h_1(t)$ and $h_2(t)$ to minimize the means square $\overline{\delta y^2} + \overline{\delta\hat{y}^2}$ of said error signals.

4. An equalization method as set out in claim 1 in which the step (b) of forming the signals $y(t)$ and $\hat{y}(t)$ comprise the steps of:

b1. applying the signal $r(t)$ to a first filter having an impulse response $h_1(t)$;

b2. applying the signal $\hat{r}(t)$ to a second filter having an impulse response $h_2(t)$;

b3. subtracting the output signal of said second filter from the output signal of said first filter to generate a signal $y(t)$; and b4. subjecting said signal $y(t)$ to a quadrature phase transformation to generate a signal $\hat{y}(t)$.

5. An equalizing method as set out in claim 4 in which the step (c) comprises the steps of:

c1. converting the cartesian coordinate signal $y(t)$ and $\hat{y}(t)$ into equalized polar coordinate signals $\rho(t)$ and $\phi(t)$;

c2. comparing at selected intervals, the values of signals $\rho(t)$ and $\phi(t)$ with reference values to generate amplitude error signals $\delta\rho$ and $\delta\phi$;

c3. converting said error signals $\delta\rho$ and $\delta\phi$ into cartesian coordinate signals $\delta y$ and $\delta\hat{y}$; and c4. adjusting said filter impulse responses $h_1(t)$ and $h_2(t)$ to minimize the mean square $\overline{\delta y^2} + \overline{\delta\hat{y}^2}$ of said error signals.

6. A signal equalizing device for the receiving end of a data transmission system in which a modulated carrier is transmitted through a transmission medium which introduces linear distortions to alter a transmitted signal, said equalizer providing the in-phase and in-quadrature components of an equalized output signal and comprising:

a. a 90° phase shifting means responsive to said distorted received signal to provide two signals $r(t)$ and $\hat{r}(t)$, one of which has its frequency components shifted substantially 90° from the other;

b. a pair of filtering means each responsive to one of said signals $r(t)$ and $\hat{r}(t)$ and means for combining the outputs of said filtering means to generate the in-phase and in-quadrature components $y(t)$ and $\hat{y}(t)$ of said equalized output signal such that $$y(t) = h1(t) \otimes r(t) - h_2(t) \otimes \hat{r}(t)$$

$$\hat{y}(t) = h_2(t) \otimes r(t) + h_1(t) \otimes \hat{r}(t)$$

where $\otimes$ represents a convolution operation and $h_1(t)$ and $h_2(t)$ are the impulse responses of two filters of each of said filtering means; and c. means responsive to said signals $y(t)$ and $\hat{y}(t)$ to generate phase change and amplitude modulation information representative of data signals being transmitted over said medium.

7. An equalizing device as set out in claim 6 and in which said pair of filtering means comprises:

b1. a first filter having an impulse response $h_1(t)$ and a second filter having an impulse response $h_2(t)$, both filters receiving said signal $r(t)$;

b2. a third filter having an impulse response $h_2(t)$ and a fourth filter having an impulse response $h_1(t)$, both said third and fourth filters receiving said signal $\hat{r}(t)$; and in which said combining means comprises:

b3. subtracting means to combine the output of said third filter subtractively with the output of said first filter to generate an equalized signal component $y(t)$; and b4. an adding means to combine the outputs of said third and fourth filters to generate an equalized signal $\hat{y}(t)$.

8. An equalizing device as set out in claim 7 and further including:

a first sampling device at the output of said transmission medium to sample said distorted signal at a rate M/T where 1/T is the transmission rate of data signals over the medium and M is an integer such that M/T is greater than twice the highest frequency of a received signal;

a second sampling means at the inputs of said pair of filtering means to sample the input signals $r(t)$ and $\hat{r}(t)$ at a rate 1/T, said device being further characterized in that all said filters are transversal filters with each including a tapped delay line with a plurality of taps spaced T seconds apart.

9. An equalizing device as set out in claim 8 and further including:

a coordinate conversion means to convert said sampled signals $y_{(k)}$ and $\hat{y}_{(k)}$ to polar coordinate representation samples $\rho_{(k)}$ and $\phi_{(k)}$;

a comparing means for each signal $\rho_{(k)}$ and $\phi_{(k)}$ to compare said signals with reference values and to provide both the best reference value and an error signal $\delta\rho_{(k)}$ or $\delta\phi_{(k)}$; and correlating devices responsive to said $\delta\rho_{(k)}$ and $\delta\phi_{(k)}$ signals from said comparing means to determine individual modification signals for said filter response coefficients $h_1(t)$ and $h_2(t)$.

10. An equalizing device as set out in claim 6 and in which said filtering means comprises:

b1. a first filter having an impulse response $h_1(t)$ and receiving said signal $r(t)$;

b2. a second filter having an impulse response $h_2(t)$ and receiving signal $\hat{r}(t)$;

b3. a subtractive device for subtractively combining the output signal from said second filter with the output signal from said first filter to generate an equalized signal component $y(t)$; and b4. a second 90° phase shifting means for performing a Hilbert transformation on signal $y(t)$ to generate a signal $\hat{y}(t)$ in which all of its frequency components are shifted 90° with respect to signal $y(t)$.

11. An equalizing circuit as set out in claim 10 and further including:

a first sampling means at the output of said transmission medium to sample said distorted received signal at a rate M/T wherein 1/T represents the transmission rate of signals over the medium and M is an integer such that M/T is higher than twice the highest frequency received from said transmission medium;

a second sampling means to sample said $y(t)$ and $\hat{y}(t)$ signals at a rate of 1/T;

said equalizing device being further characterized in that said filters are transversal filters, each having a tapped delay line with the taps spaced apart at a time interval of 1/T,

* * * * *